(12) United States Patent
Huang

(10) Patent No.: US 11,314,035 B2
(45) Date of Patent: Apr. 26, 2022

(54) ADJUSTABLE OPTICAL ELEMENT SUPPORTING STRUCTURE

(71) Applicant: National Applied Research Laboratories, Taipei (TW)

(72) Inventor: Yi-Kai Huang, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 17/107,131

(22) Filed: Nov. 30, 2020

(65) Prior Publication Data
US 2022/0019049 A1  Jan. 20, 2022

(30) Foreign Application Priority Data
Jul. 20, 2020  (TW) .................................. 109124476

(51) Int. Cl.
G02B 27/00 (2006.01)
G02B 7/02 (2021.01)
G02B 7/183 (2021.01)

(52) U.S. Cl.
CPC ............. *G02B 7/023* (2013.01); *G02B 7/183* (2013.01)

(58) Field of Classification Search
CPC ................................. G02B 7/023; G02B 7/183

USPC ......................................................... 359/823
See application file for complete search history.

(56) References Cited

FOREIGN PATENT DOCUMENTS

CN            107811605      *  3/2018

* cited by examiner

*Primary Examiner* — James C. Jones
(74) *Attorney, Agent, or Firm* — Birch, Stewart, Kolasch & Birch, LLP

(57) ABSTRACT

The present invention is directed to an adjustable optical element supporting structure comprising a first structure group, a second structure group, a third structure group and a fourth structure group. The second structure group is disposed on the first structure group, the third structure group is disposed on the second structure group, and the fourth structure group is disposed on the third structure group. Each of the first structure group, the second structure group and the third structure group includes a supporting beam and a node assemble, and the position of the node assemble can be adjusted along a radial or a tangential direction. The fourth structure group is a supporting member having three branches, and a supporting pad made by an elastic material is disposed on the supporting member for supporting an optical element. Accordingly, the present invention can evenly support the optical element having different sizes and structures.

7 Claims, 4 Drawing Sheets

ADJUSTABLE OPTICAL ELEMENT SUPPORTING STRUCTURE

TECHNICAL FIELD

The present invention generally relates to optical element supporting structures, more particularly, to adjustable optical element supporting structures.

BACKGROUND

Supporting structures are critical for large optical elements, such as reflective lenses used in space telescopes, which have large apertures and weigh tens of kilograms or even hundreds of kilograms. Such optical elements demand designs for reducing weight. Also, the reflective surfaces of the lenses are subjected to ultra-precision polishing processes to achieve the optical accuracy on a scale of tens of nanometers. However, how to support the optical elements during the manufacturing processes or in practical application to reduce deformation of the optical elements caused by the transmission of extra stress thereto becomes a continuing challenge. In particular, the weight-reducing optical element would be more sensitive to the stress transmission of the mechanism than the solid optical element. Therefore, the optical accuracy measurement of the weight-reducing optical element requires higher stability and uniformity of the optical supporting structure.

Conventional supporting structures can only be used to support solid optical elements and have fixed supporting sites. That is, the conventional supporting structures cannot be adjusted to accommodate optical elements with different configurations. On the other hand, the conventional supporting structures may adopt active control elements, which results in difficult operation and maintenance, as well as high development costs.

Accordingly, there is a need for a practical and low-cost optical element supporting structure which is adjustable for different configurations of optical elements.

SUMMARY

For solving the above problems, the present invention provides a practical and cost-efficient adjustable optical element supporting structure, which can be adjusted for optical elements with different configurations. In one aspect, an adjustable optical element supporting the structure of the present invention comprising:

a first structure group comprising a first-level circular base plate, three first-level supporting beams, and three first-level node assembles, wherein said three first-level supporting beams are disposed about 120 degrees from one another about the circumference of the circular base plate, wherein each of the three supporting beams is equipped with a first-level sliding rail extending outwardly in a radial direction of the circular base plate, and wherein said three first-level node assembles are respectively disposed on said sliding rails and are capable of moving along the sliding rails to a desired position;

a second structure group, disposed on the first structure group, comprising a plurality of second-level adapter plates, a plurality of second-level supporting beams and a plurality of second-level node assembles, wherein the second-level adapter plate is fixed on the first-level node assemble, wherein each of the second-level supporting beams is equipped with a second-level sliding rail extending along the tangent direction of the circumference of the circular base plate, and wherein said second-level node assembles are respectively disposed on said second-level sliding rails and are capable of moving along the second-level sliding rails to a desired position;

a third structure group, disposed on the second structure group, comprising a plurality of third-level circular adapter plates, a plurality of third-level supporting beams and a plurality of third-level node assembles, wherein the third-level adapter plate is fixed on the second-level node assemble, the plurality of third-level supporting beams are disposed on the third-level circular adapter plates, wherein each of the third-level supporting beams is equipped with a third-level sliding rail extending outwardly in a radial direction of the third-level circular adapter plate, and wherein said third-level node assembles are respectively disposed on said third-level sliding rails and are capable of moving along the third-level sliding rails to a desired position; and a fourth structure group, disposed on the third structure group, comprising a supporting member fixed on the third-level node assembles, wherein the supporting member has three branches, and wherein each of the branches extending outwardly from a center and is disposed about 120 degrees from one another.

Each of the first-level node assembles comprises a first-level node susceptor, a first-level spherical washer joint and a first-level fastener, wherein the first-level spherical washer joint is disposed over the first-level node susceptor, and the first-level fastener is disposed below the first-level node susceptor to fix the first-level node susceptor.

The second structure group comprises three second-level adapter plates, each of which is mounted on the first-level spherical washer joint, and six second-level supporting beams. Each of the second-level adapter plates has two second-level supporting beams mounted thereon, wherein said two second-level supporting beams are mounted symmetrically to the corresponding first-level supporting beam. The second-level sliding rail is extended along the tangent direction of the circumference of the circular base plate. Besides, the second structure group comprises six second-level node assembles, each of which is disposed respectively on the six second-level sliding rails and is capable of moving along the second-level sliding rail to a desired position.

Each of the second-level node assembles comprises a second-level node susceptor, a second-level spherical washer joint and a second-level fastener, wherein the second-level spherical washer joint is disposed over the second-level node susceptor, and the second-level fastener is disposed below the second-level node susceptor to fix the second-level node susceptor.

The third structure group comprises six third-level circular adapter plates, each of which is mounted respectively on the second-level spherical washer joints and has three third-level supporting beams mounted thereon, wherein the three third-level supporting beams are disposed about 120 degrees from one another about the circumference of the circular base plate. Each of the third-level supporting beams has a third-level node assemble disposed thereon, and the third-level node assemble is capable of moving along the third-level sliding rail to a desired position.

Each of the third-level node assembles comprises a third-level node susceptor, a third-level spherical washer joint and a third-level fastener, wherein the third-level spherical washer joint is disposed over the third-level node susceptor, and the third-level fastener is disposed below the third-level node susceptor to fix the third-level node susceptor.

Each of the supporting members having three branches is fixed on the third-level spherical washer joint. A supporting pad is disposed on the top surface of each of the branches, wherein the supporting pad is made of an elastic material.

Based on the above, with the first, second, third and fourth structure groups, wherein each of the first, second and third structure groups has supporting beams and node assembles that can regulate the locations of the node assembles along with radial or tangent directions and the fourth structure group is a supporting member having three branches that equipped with supporting pads of elastic material, the optical element supporting structure of the present invention can be adjusted to support optical elements with different diameters or structures to evenly support the optical elements.

DETAILED DESCRIPTION

Figure 1:
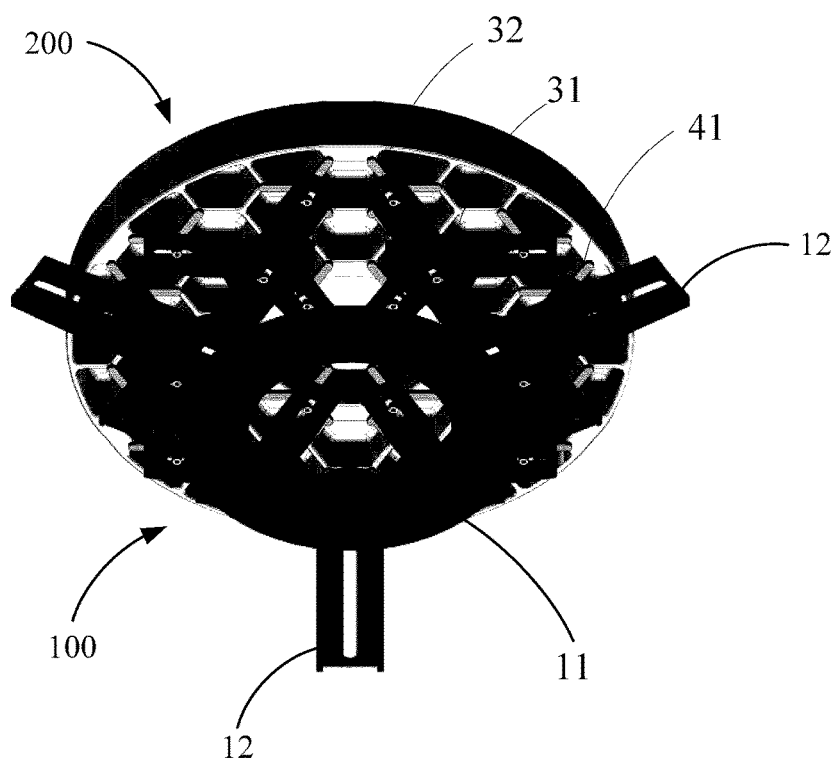
FIG. 1 is a perspective view of an adjustable optical element supporting structure and an optical element according to an embodiment of the present disclosure.
Figure 2:
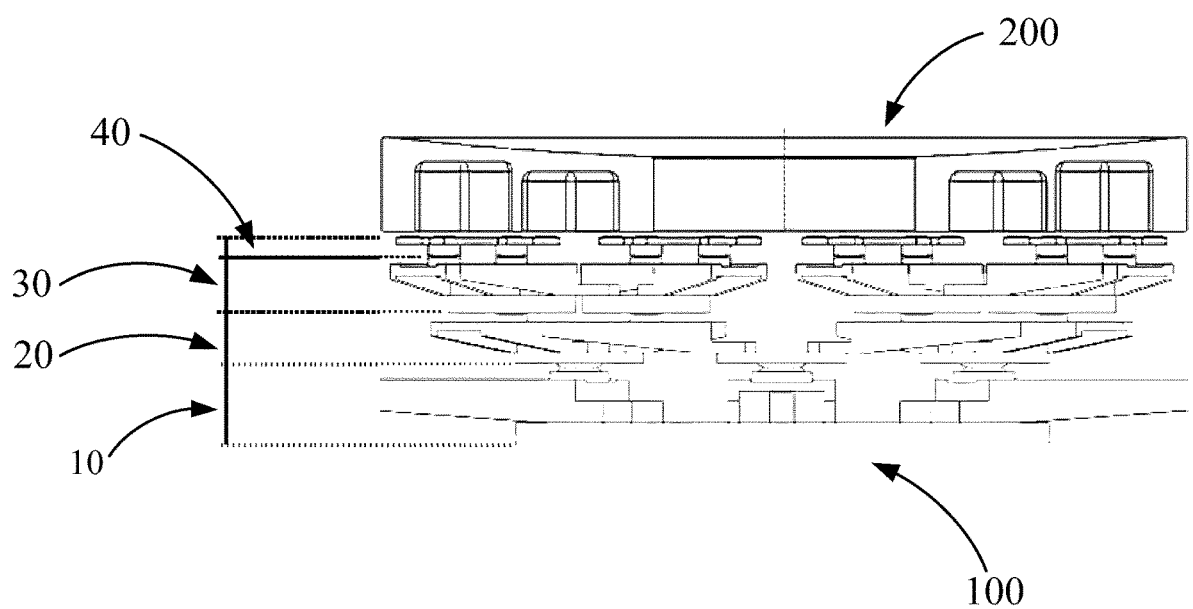
FIG. 2 is a side view of an adjustable optical element supporting structure and an optical element according to an embodiment of the present disclosure.
Figure 3:
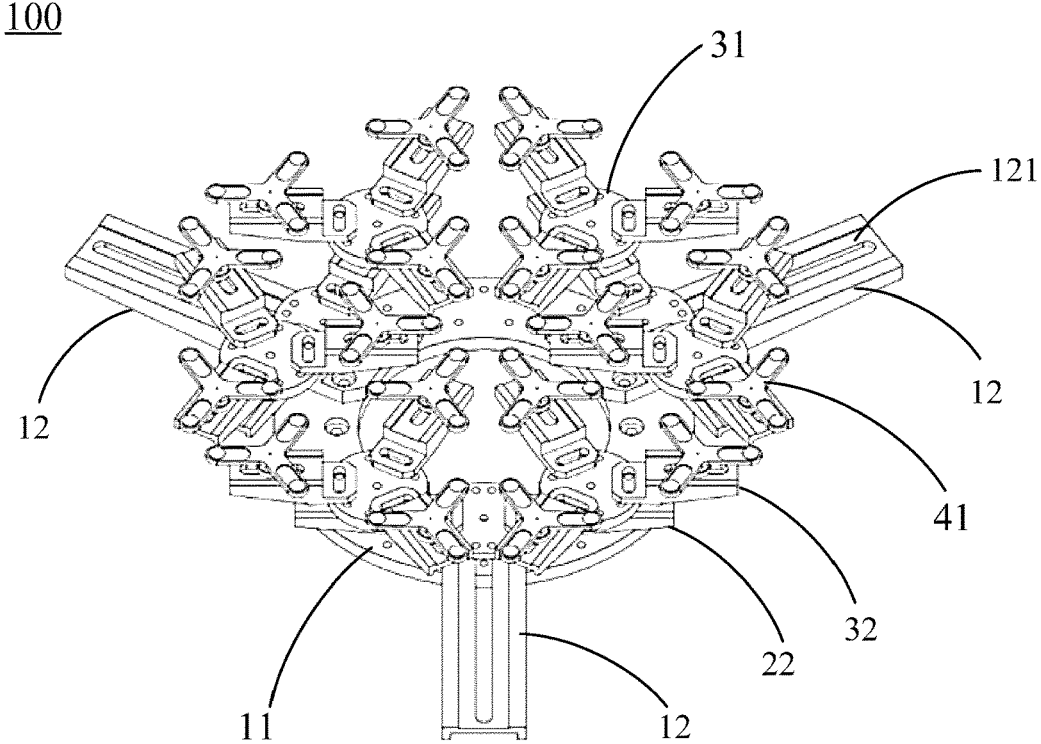
FIG. 3 is a perspective view of an adjustable optical element supporting structure according to an embodiment of the present disclosure.
Figure 4:
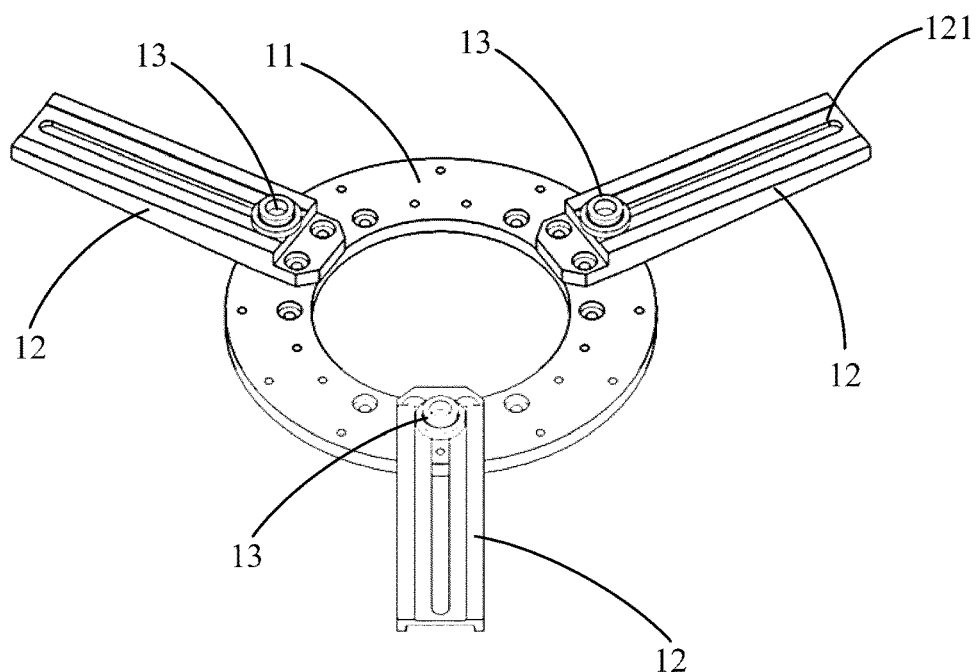
FIG. 4 is a perspective view of the first structure group according to an embodiment of the present disclosure.

Referring to FIGS. 1 and 2, FIG. 1 is a perspective view of an adjustable optical element supporting structure and an optical element according to an embodiment of the present disclosure, and FIG. 2 is a side view of an adjustable optical element supporting structure and an optical element according to an embodiment of the present disclosure. In addition, FIG. 3 is a perspective view of an adjustable optical element supporting structure according to an embodiment of the present disclosure. The adjustable optical element supporting structure 100 of the present invention can be used for supporting an optical element 200. Referring to FIG. 2, the adjustable optical element supporting structure 100 comprises a four-layer structure having a first structure group 10, a second structure group 20, a third structure group 30 and a fourth structure group 40. The first structure group 10 comprises a first-level circular base plate 11, three first-level supporting beams 12, and three first-level node assembles 13. Please refer to FIG. 4. FIG. 4 is a perspective view of the first structure group according to an embodiment of the present disclosure. The first-level circular base plate 11 can be a round plate or a ring-shaped plate. In an embodiment, the first-level circular base plate 11 is a ring-shaped plate, as shown in FIG. 4. The three first-level supporting beams 12 are disposed about 120 degrees from one another about the circumference of the circular base plate 11. Each supporting beam 12 is equipped with a first-level sliding rail 121 extending outwardly in a radial direction of the circular base plate 11. Three first-level node assembles 13 are respectively disposed on said sliding rails 121 and are capable of moving along the sliding rails 121 to a desired position. In particular, please refer to FIG. 5, which shows a sectional view of a node assemble according to an embodiment of the present disclosure. Each of the first-level node assembles 13 comprises a first-level node susceptor 131, a first-level spherical washer joint 132 and a first-level fastener 133. The first-level spherical washer joint 132 is disposed over the first-level node susceptor 131, which can move along the first-level sliding rail 121 to a desired position. Moreover, the first-level node susceptor 131 can be fixed by the first-level fastener 133.

Referring to FIGS. 1 and 2, FIG. 1 is a perspective view of an adjustabl Referring to FIGS. 1 and 2, FIG. 1 is a perspective view of an adjustabl Because the first-level sliding rail 121 extends outwardly in a radial direction of the circular base plate 11, the positions of the three first-level node assembles 13 can be adjusted along the radial direction of the circular base plate 11, to properly support the optical element 200 in cooperation with the second structure group 20, the third structure group 30 and the fourth structure group 40. In particular, a first-level recess 1311 is disposed on the top of the first-level node susceptor 131, and a first-level thread hole 1312 is disposed on the bottom of the first-level node susceptor 131. The first-level fastener 133 can fasten the first-level node susceptor 131 through the first-level thread hole 1312, to fix the location of the first-level node susceptor 131 on the first-level sliding rail 121. When the first-level fastener 133 is released, the first-level node susceptor 131 can move relative to the first-level sliding rail 121 to adjust its position. The first-level spherical washer joint 132 is accommodated and mounted in the first-level recess 1311. In addition, he spherical washer joint can provide an angle adjustment margin to compensate for the angle error between the upper and lower structure groups due to the tolerance of the mechanical parts.

Figure 6:
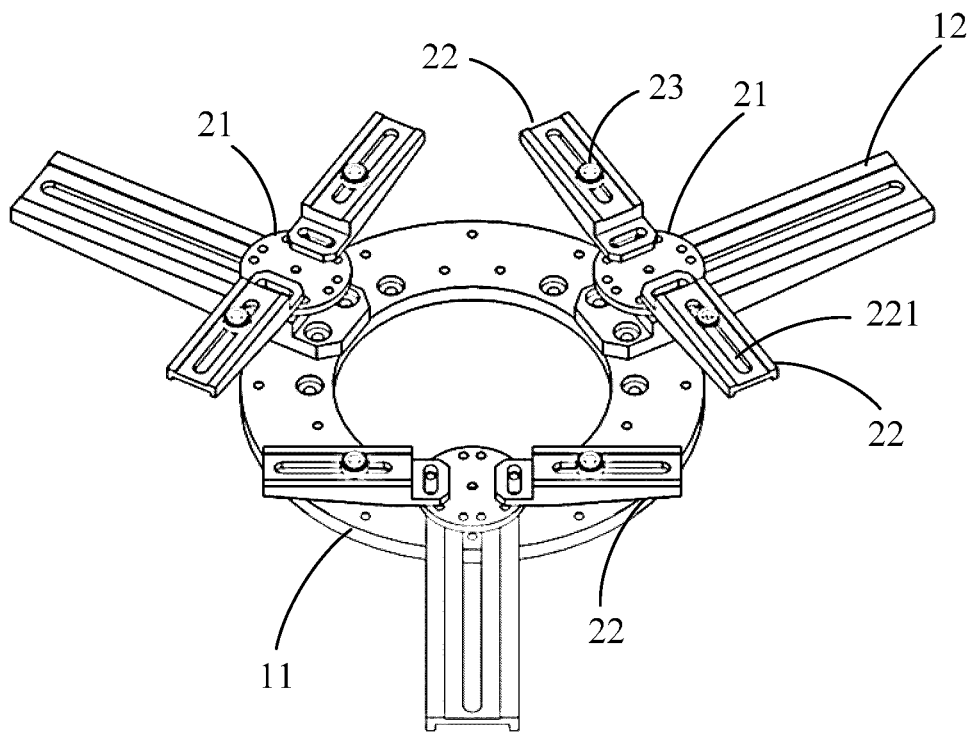
FIG. 6 is a perspective view of the first and second structure groups according to an embodiment of the present disclosure.

Referring to FIGS. 1 and 2, FIG. 1 is a perspective view of an adjustabl Referring to FIGS. 3 and 6, FIG. 6 is a perspective view of the first and second structure groups according to an embodiment of the present disclosure. The second structure group 20 is disposed on the first structure group 10 and comprises a plurality of second-level adapter plates 21, a plurality of second-level supporting beams 22 and a plurality of second-level node assembles 23. The second-level adapter plate 21 is fixed on the first-level node assemble 13, in particular, on the first-level spherical washer joint 132. Each second-level adapter plates 21 has two second-level supporting beams 22 mounted thereon. Said two second-level supporting beams 22 are mounted symmetrically to the corresponding first-level supporting beam 12. Each second-level supporting beam 22 is equipped with a second-level sliding rail 221 extending along the tangent direction of the circumference of the circular base plate 11. The second-level node assembles 23 are respectively disposed on the second-level sliding rails 221 and are capable of moving along the second-level sliding rails 221 to a desired position. Because the second-level sliding rail 221 extends along the tangent direction of the circumference of the circular base plate 11, the positions of the three second-level node assembles 23 can be adjusted along the tangent direction of the circular base plate 11, to properly support the optical element 200 in cooperation with the first structure group 10, the third structure group 30 and the fourth structure group 40.

Figure 5:
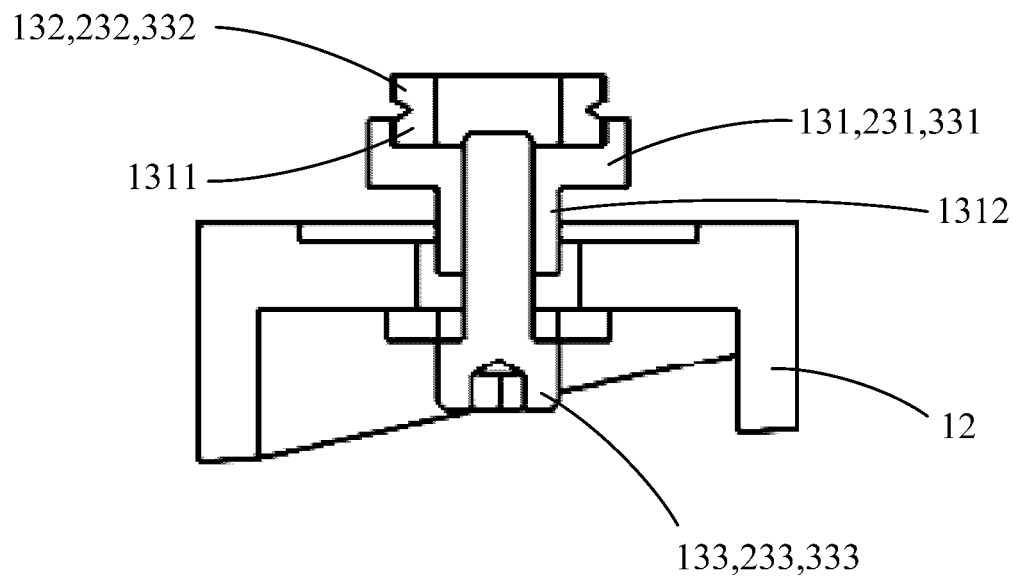
FIG. 5 is a sectional view of a node assemble according to an embodiment of the present disclosure.

Referring to FIGS. 1 and 2, FIG. 1 is a perspective view of an adjustabl The second-level node assemble 23 can be the same as the first-level node assemble 13. As shown in FIG. 5, the second-level node assemble 23 comprises a second-level node susceptor 231, a second-level spherical washer joint 232 and a second-level fastener 233. The second-level spherical washer joint 232 is disposed over the second-level node susceptor 231. The second-level fastener 233 is disposed below the second-level node susceptor 231 to fix the second-level node susceptor 231.

Figure 7:
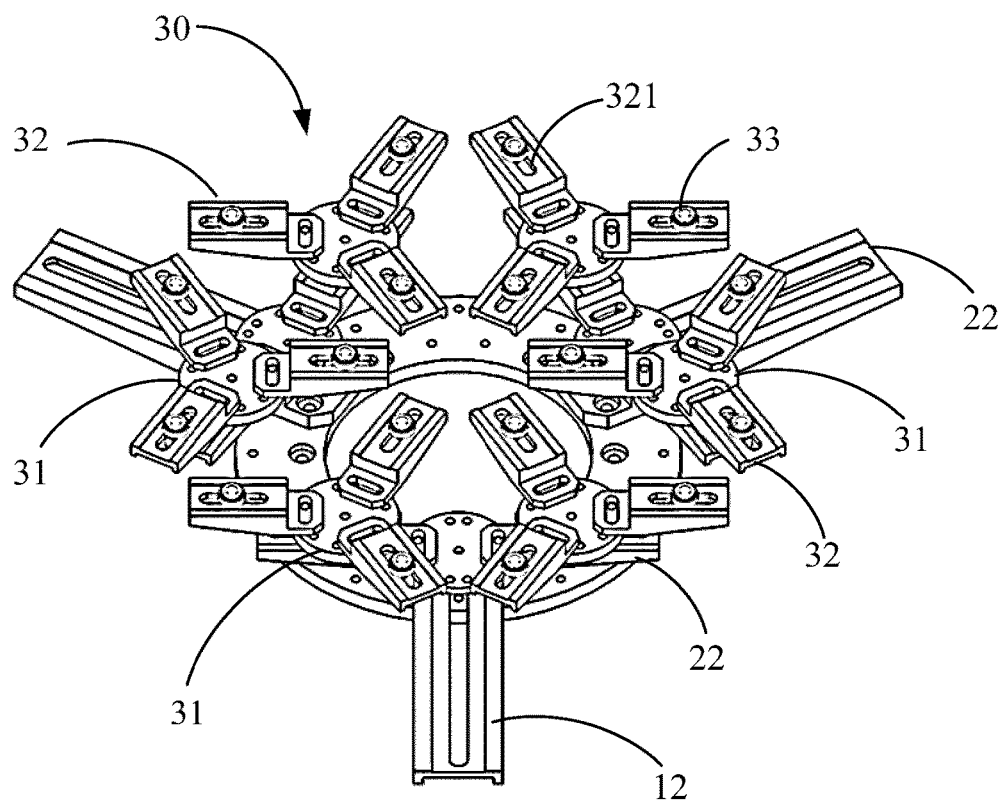
FIG. 7 is a perspective view of the first, second and third structure groups according to an embodiment of the present disclosure.

Referring to FIGS. 1 and 2, FIG. 1 is a perspective view of an adjustabl Referring now to FIG. 7, FIG. 7 is a perspective view of the first, second and third structure groups according to an embodiment of the present disclosure. The third structure group 30 is disposed on the second structure group 20. The third structure group 30 comprises a plurality of third-level circular adapter plates 31, a plurality of third-level supporting beams 32 and a plurality of third-level node assembles 33. The third-level adapter plate 31 is fixed on the second-level node assemble 23, and the plurality of third-level supporting beams 32 are disposed on the third-level circular adapter plates 31 with about 120 degrees from one another about the circumference of the third-level circular adapter plates 31. Each third-level supporting beam 32 is equipped with a third-level sliding rail 321 extending outwardly in a radial direction of the third-level circular adapter plates 31. The third-level node assembles 33 are respectively disposed on the third-level sliding rails 321 and are capable of moving along the third-level sliding rails 321 to a desired position. Because the third-level sliding rail 321 extends outwardly in a radial direction of the third-level circular adapter plates 31, the positions of the three third-level node assembles 33 can be adjusted along the radial direction of the third-level circular adapter plates 31, to properly support the optical element 200 in cooperation with the first structure group 10, the second structure group 20 and the fourth structure group 40. The third-level node assemble 33 is the same as the first-level node assemble. As shown in FIG. 5, each of the third-level node assembles 33 comprises a third-level node susceptor 331, a third-level spherical washer joint 332 and a third-level fastener 333. The third-level spherical washer joint 332 is disposed over the third-level node susceptor 331. The third-level fastener 333 is disposed below the third-level node susceptor 331 to fix the third-level node susceptor 331.

Figure 8A:
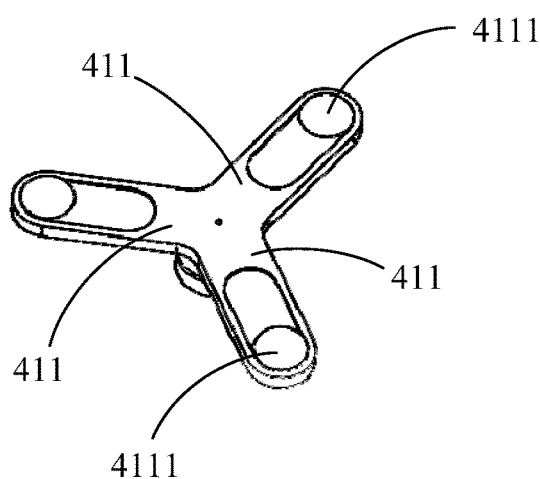
FIG. 8a is a top perspective view of a supporting member having three branches according to an embodiment of the present disclosure.
Figure 8B:
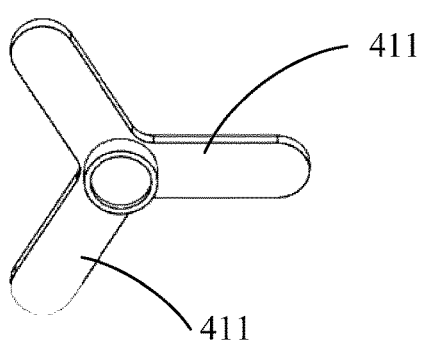
FIG. 8b is a bottom perspective view of a supporting member having three branches according to an embodiment of the present disclosure.

Referring to FIGS. 1 and 2, FIG. 1 is a perspective view of an adjustabl As shown in FIGS. 3, 8a and 8b, the fourth structure group 40 is disposed on the third structure group 30 and includes a supporting member 41 having three branches. FIG. 8a is a top perspective view of the supporting member 41 having three branches according to an embodiment of the present disclosure. FIG. 8b is a bottom perspective view of the supporting member 41 having three branches according to an embodiment of the present disclosure. The supporting member 41 has three branches extending outwardly from a center. The branches are fixed on the third-level node assembles 33 and disposed about 120 degrees from one another. Particularly, these branches are fixed on the third-level spherical washer joint 332 of the third-level node assembles 33. Furthermore, a supporting pad 4111 is disposed on the top surface of each of the branches 411, and wherein the supporting pad 4111 is made of an elastic material. The supporting pad 4111 contacts and supports the optical element 200, evenly and stably.

Referring to FIGS. 1 and 2, FIG. 1 is a perspective view of an adjustabl Based on the above, with the first, second, third and fourth structure groups 10, 20, 30, 40, wherein each of the first, second and third structure groups 10, 20, 30 has supporting beams and node assembles that can regulate the locations of the node assembles along radial or tangent directions and the fourth structure group 40 is a supporting member having three branches that equipped with supporting pads of elastic material, the optical element supporting structure of the present invention can be adjusted to support optical elements 200 with different diameters or structures to evenly support the optical elements 200.

Referring to FIGS. 1 and 2, FIG. 1 is a perspective view of an adjustabl Although the disclosure herein has been described with reference to preferred embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

The invention claimed is:

1. An adjustable optical element supporting structure comprising:
   a first structure group comprising a first-level circular base plate, three first-level supporting beams, and three first-level node assembles, wherein said three first-level supporting beams are disposed about 120 degrees from one another about the circumference of the circular base plate, wherein each of the three supporting beams is equipped with a first-level sliding rail extending outwardly in a radial direction of the circular base plate, and wherein said three first-level node assembles are respectively disposed on said sliding rails and are capable of moving along the sliding rails to a desired position;
   a second structure group, disposed on the first structure group, comprising a plurality of second-level adapter plates, a plurality of second-level supporting beams and a plurality of second-level node assembles, wherein the second-level adapter plate is fixed on the first-level node assemble, wherein each of the second-level supporting beams is equipped with a second-level sliding rail extending along the tangent direction of the circumference of the circular base plate, and wherein said second-level node assembles are respectively disposed on said second-level sliding rails and are capable of moving along the second-level sliding rails to a desired position;
   a third structure group, disposed on the second structure group, comprising a plurality of third-level circular adapter plates, a plurality of third-level supporting beams and a plurality of third-level node assembles, wherein the third-level adapter plate is fixed on the second-level node assemble, the plurality of third-level supporting beams are disposed on the third-level circular adapter plates, wherein each of the third-level supporting beams is equipped with a third-level sliding rail extending outwardly in a radial direction of the third-level circular adapter plate, and wherein said third-level node assembles are respectively disposed on said third-level sliding rails and are capable of moving along the third-level sliding rails to a desired position;

a fourth structure group, disposed on the third structure group, comprising a supporting member fixed on the third-level node assembles, wherein the supporting member has three branches, and wherein each of the branches extending outwardly from a center and is disposed about 120 degrees from one another.

2. The adjustable optical element supporting structure of claim 1, wherein each of the first-level node assembles comprises a first-level node susceptor, a first-level spherical washer joint and a first-level fastener, wherein the first-level spherical washer joint is disposed over the first-level node susceptor, and the first-level fastener is disposed below the first-level node susceptor to fix the first-level node susceptor.

3. The adjustable optical element supporting structure of claim 2, wherein the second structure group comprises three second-level adapter plates, six second-level supporting beams and six second-level node assembles, wherein each of the second-level adapter plates is mounted on the first-level spherical washer joint and has two second-level supporting beams mounted thereon, wherein said two second-level supporting beams are mounted symmetrically to the corresponding first-level supporting beam, wherein the second-level sliding rail is extended along the tangent direction of the circumference of the circular base plate, and wherein each of the six second-level node assembles is disposed respectively on the six second-level sliding rails and is capable of moving along the second-level sliding rail to a desired position.

4. The adjustable optical element supporting structure of claim 3, wherein each of the second-level node assembles comprises a second-level node susceptor, a second-level spherical washer joint and a second-level fastener, wherein the second-level spherical washer joint is disposed over the second-level node susceptor, and the second-level fastener is disposed below the second-level node susceptor to fix the second-level node susceptor.

5. The adjustable optical element supporting structure of claim 4, wherein the third structure group comprises six third-level circular adapter plates, wherein each of the third-level circular adapter plates is mounted respectively on the second-level spherical washer joints and has three third-level supporting beams mounted thereon, wherein the three third-level supporting beams are disposed about 120 degrees from one another about the circumference of the circular base plate, wherein each of the third-level supporting beams has a third-level node assemble disposed thereon, and the third-level node assemble is capable of moving along the third-level sliding rail to a desired position.

6. The adjustable optical element supporting structure of claim 5, wherein each of the third-level node assembles comprises a third-level node susceptor, a third-level spherical washer joint and a third-level fastener, wherein the third-level spherical washer joint is disposed over the third-level node susceptor, and the third-level fastener is disposed below the third-level node susceptor to fix the third-level node susceptor.

7. The adjustable optical element supporting structure of claim 6, wherein each of the supporting members having three branches is fixed on the third-level spherical washer joint, a supporting pad is disposed on the top surface of each of the branches, and wherein the supporting pad is made of an elastic material.

* * * * *